F. V. SANDFORD.
Electric Gas-Lighting Apparatus.
No. 166,304. Patented Aug. 3, 1875.
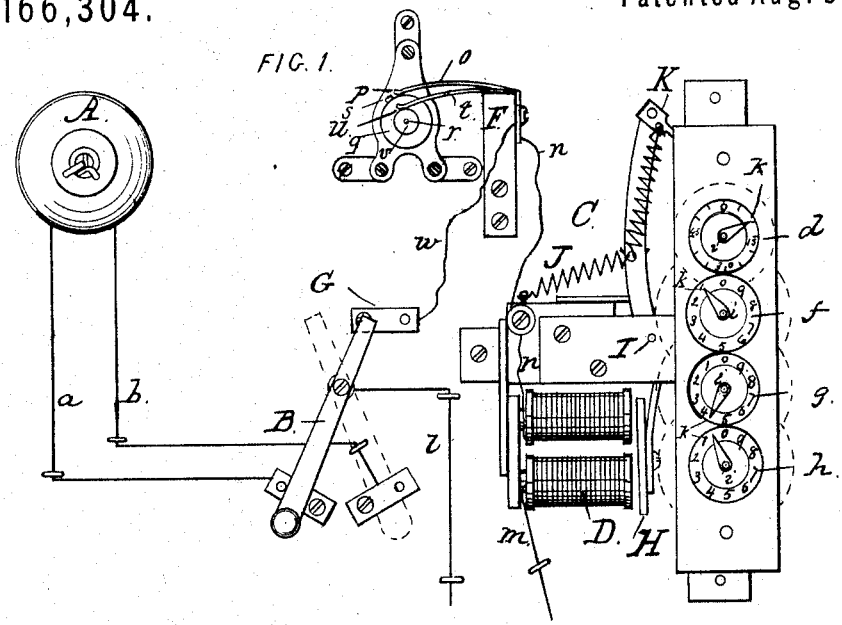
Fig. 1.
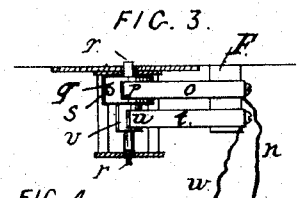
Fig. 3.
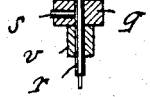
Fig. 4.
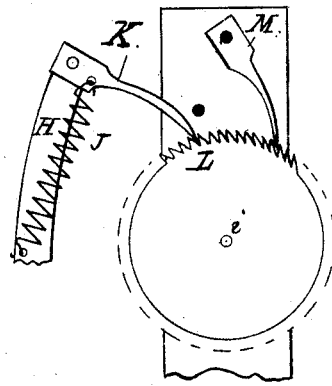
Fig. 2.
Fig. 5.
WITNESSES.
Geo. H. Earl
John Fetherston
INVENTOR.
F. V. Sandford
Per Brown Bro.
Attorneys
N. PETERS, PHOTO-LITHOGRAPHER, WASHINGTON, D.C.

UNITED STATES PATENT OFFICE.

FRANK V. SANDFORD, OF CHELSEA, MASSACHUSETTS.

IMPROVEMENT IN ELECTRIC GAS-LIGHTING APPARATUS.

Specification forming part of Letters Patent No. 166,304, dated August 3, 1875; application filed July 14, 1875.

*To all whom it may concern:*

Be it known that I, FRANK V. SANDFORD, of Chelsea, in the county of Suffolk and State of Massachusetts, have invented new and useful Improvements in Electrical Gas-Lighting Apparatus, of which the following is a specification:

This invention relates to apparatus for the lighting of street and other gas-burners by the action of electrical currents; and it consists of the combination, with such apparatus, of mechanism which is constructed and arranged to register under, or from, or because of, the action of an electrical current which is in and through the circuit of the street or other gas-burners when lighted, the length of time during which said burners burn, and to properly indicate the same, so that the amount of gas consumed by the burners in said circuit in any period or periods of time can be estimated.

In the accompanying plate of drawings the present improvements are illustrated, Figure 1 being a general plan view of their adaptation to a single gas-burner; Figs. 2, 3, 4, and 5, detail views, illustrating the parts of connection between a gas-burner and the registering mechanism for carrying out the purposes of this invention.

In the drawings, A represents a gas-burner provided or connected with any suitable apparatus for lighting and extinguishing it by an electrical current or currents—as, for instance, the apparatus described and shown in the schedule annexed to the Letters Patent issued to Jacob P. Tirrell, dated August 20, 1872, and numbered 130,770; and in this apparatus $a$ and $b$ are, respectively, the current-wires for lighting and for extinguishing the burner and B the switch by which to throw the current through either wire, as desired, all as usual in said and other electrical gas-lighting apparatus. C, a mechanism for registering at the series of dials $d, f, g,$ and $h$ the length of time—as, for instance, the days, hours, minutes, and seconds— which said mechanism is run, either consecutively, or from time to time, according to the circumstances under which it is used. This mechanism C consists, substantially, of a train of gears which operate upon the separate spindles $i$ of pointers $k$ of the dials $d, f, g,$ and $h$, to carry the pointer $k$ of the second dial $f$ over one space between the graduations of its dial each time the pointer $k$ of dial $d$ makes one complete revolution about its said dial, and then to carry the pointer $k$ of the third dial $g$ over one space between the graduations of its dial $g$ each time the pointer $k$ of dial $f$ makes one complete revolution about said dial $f$, and so on through the whole series; and, as such an arrangement, or a train of gears, pointers, and dial-faces, is well known and common, it is not deemed necessary to herein more particularly describe it, except to remark that, as it is to be used for registering the lapse of time, the graduations of the several dials and the arrangement of the train of gears are to be such as to secure the proper registration and indication of any given unit of time—as, for instance, minutes in hours and days—which the said mechanism runs, either consecutively, or from time to time, as hereinafter described; $l$, a wire, connecting at one end with switch B, and at the other with one pole of a battery, and $m$ a wire connecting at one end with one pole of an electro-magnet, D, and at the other with the pole of the battery before referred to, which is opposite to the pole with which the wire $l$ connects; $n$, a wire leading from the opposite pole of magnet D to that of its wire connection $m$, and connecting said pole with a spring finger-piece, $o$, arranged to bear, by its free end $p$, upon the periphery of a drum, $q$, secured to a spindle, $r$, and which is electrically insulated therefrom, except as to its point $s$, and which is arranged to turn, by any suitable clock mechanism, so as to make a complete revolution, under the action of such clock mechanism, once for every unit of time for which the registering mechanism C, hereinbefore referred to, is adapted to register; $t$, a spring-finger, which is similar to spring-finger $o$, before referred to, and is attached, with the said finger $o$, to a common insulated block, F, so as to constantly bear, by its free end $u$, on the collar $v$ of the spindle $r$ before referred to, as said spindle and its collar $v$ revolve; $w$, a wire connecting spring-finger $t$ with a plate, G, located in a suitable position for the switch B, when turned, to close the circuit through the wire $a$ to light the burner A to come to a bearing thereon, and thus make a connection between said lighting-circuit of the burner and the spring-finger $t$, in direct connection with the plate G, by wire $w$, as above described; H, the armature to the electro-magnet D. This armature swings on a center or fulcrum, I, and, by a spring, J, connected with it, is held from and taken out of contact with the magnet when the electric circuit through it is broken; K, a spring-pawl carried by armature, and arranged to act on a ratchet-wheel, L, of the spindle $i$, to minute-dial $d$ so as to turn it the length of one graduation of the said dial each and every time the armature is attracted by the electro-magnet, from the action of an electric current through it, and M a spring-pawl to hold the ratchet from a backward movement.

Under the arrangement of wires and other parts, above described, when the switch B is put into connection with the lighting-wire $a$ for the burner A, the switch also connects the wire $w$, which leads from plate G to spring-finger $t$, with the wire $l$, which leads from the switch B to a battery, as above described, and thus, because of the other wire-connection with same battery, and between it and the electro-magnet D, and clock mechanism, acting on drum $q$, secures, at each and every completed revolution of the drum, because of its point $s$, the close and break of the circuit through the magnet D, which causes the armature H, through its spring-pawl, to operate the ratchet-wheel, and, through it, the registering-mechanism connected with it, whereby the length of time which the electrical current is, through the lighting-wire $a$, recorded in minutes as a unit, thus enabling the amount of gas consumed by the burner or burners in the circuit of said lighting-wire to be accurately estimated.

Having now described my invention, what I claim, and desire to secure by Letters Patent, is—

The combination, with an electrical gas-lighting apparatus, of a time-registering mechanism, substantially as herein described, for the purpose specified.

The above specification of my invention signed by me this 3d day of July, A. D. 1875.

F. V. SANDFORD.

Witnesses:
  EDWIN W. BROWN,
  GEO. H. EARL.